(12) United States Patent
Parkinson et al.

(10) Patent No.: US 9,584,320 B1
(45) Date of Patent: Feb. 28, 2017

(54) BLINDING FUNCTION IN ELLIPTIC CURVE CRYPTOGRAPHY

(71) Applicant: EMC Corporation, Hopkinton, MA (US)

(72) Inventors: Sean F. Parkinson, Indooroopilly (AU); Eric A. Young, Annerley (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/581,409

(22) Filed: Dec. 23, 2014

(51) Int. Cl.
*H04L 9/00* (2006.01)
*H04L 9/08* (2006.01)

(52) U.S. Cl.
CPC ........... *H04L 9/0869* (2013.01); *H04L 9/0816* (2013.01); *H04L 2209/24* (2013.01)

(58) Field of Classification Search
CPC ... H04L 9/0869; H04L 2209/24; H04L 9/0816
USPC .......................................................... 380/46
See application file for complete search history.

(56) References Cited

U.S. PATENT DOCUMENTS

| | | | | |
|---|---|---|---|---|
| 7,058,808 B1* | 6/2006 | Zolotorev | ............. | H04L 9/3249 713/176 |
| 7,668,310 B2* | 2/2010 | Kocher | ................. | G06F 21/556 380/28 |
| 7,961,874 B2* | 6/2011 | Ibrahim | ................... | G06F 7/725 380/28 |
| 8,345,864 B1 | 1/2013 | Robinson et al. | | |
| 8,411,855 B1 | 4/2013 | Robinson et al. | | |
| 8,428,252 B1 | 4/2013 | Makepeace et al. | | |
| 8,498,411 B1 | 7/2013 | Parkinson et al. | | |
| 2005/0152541 A1* | 7/2005 | Takenaka | ................ | G06F 7/725 380/28 |
| 2008/0044010 A1* | 2/2008 | Vasyltasov | .............. | G06F 7/725 380/28 |
| 2011/0093721 A1* | 4/2011 | Perlman | ................ | G06F 21/602 713/189 |
| 2011/0119488 A1* | 5/2011 | Jakobsson | ............. | H04L 9/3013 713/168 |
| 2012/0008780 A1* | 1/2012 | Al-Somani | ............. | G06F 7/725 380/255 |
| 2012/0207298 A1* | 8/2012 | Meyer | ..................... | G06F 7/725 380/28 |

OTHER PUBLICATIONS

David J. Malan; A Public-Key Infrastructure for Key Distribution in TinyOS Based on Elliptic Curve Cryptography; Division of Engineering and Applied Sciences Harvard University; Year: 2004; p. 1-11.*

D.M. Kuthe et al., "Implementation of Blind Digital Signature Using ECC and Zero Knowledge Protocol," International Journal of Scientific and Research Publications (IJSRP), Sep. 2012, 4 pages, vol. 2, No. 9.

(Continued)

*Primary Examiner* — Monjour Rahim
(74) *Attorney, Agent, or Firm* — Ryan, Mason & Lewis, LLP (57) ABSTRACT

A blinding function is generated. The blinding function is applied to a random value to generate a blinded random value. The blinded random value is utilized for one or more scalar multiplications in an elliptic curve cryptographic operation.

20 Claims, 4 Drawing Sheets

(56) References Cited

OTHER PUBLICATIONS

J. Fan et al., "State-of-the-Art of Secure ECC Implementations: a Survey on Known Side-Channel Attacks and Countermeasures," IEEE International Symposium on Hardware-Oriented Security and Trust (HOST), Jun. 2010, pp. 76-87.

B. Feix et al., "Side-Channel Analysis on Blinded Regular Scalar Multiplications, Extended Version," 15th International Conference on Cryptology (Indocrypt), Dec. 2014, 25 pages, New Delhi, India.

Wikipedia, "Blinding (Cryptography)," http://en.wikipedia.org/w/index.php?title=Binding_(cryptography) &printable=yes, Mar. 2014, 2 pages.

Wikipedia, "Side Channel Attack," http://en.wikipedia.org/w/index.php?title=Side_channel_attack&printable=yes, Oct. 2014, 6 pages.

K. Mowery et al., "Are AES x86 Cache Timing Attacks Still Feasible?" ACM Workshop on Cloud Computing Security Workshop (CCSW), Oct. 2012, pp. 19-24.

\* cited by examiner

BLINDING FUNCTION IN ELLIPTIC CURVE CRYPTOGRAPHY

FIELD

The field relates to computer networks, and more particularly to cryptographic algorithms employed in such computer networks.

BACKGROUND

A side channel attack on a cryptographic algorithm measures some physical medium associated with a computing system that performs the cryptographic algorithm (e.g., cryptosystem) while the cryptographic algorithm is executing. The measurement can either directly or indirectly be used to determine some private/secret information. Efficient implementations of cryptographic algorithms often require different amounts of work to be performed based on the value of a secret. Typically, there is a difference in the amount of work based on whether a bit in the secret is a logic one or a logic zero. If enough applications of the algorithm with the same key but different public data are measured, then a statistical analysis can be performed to determine which bits were logic ones and which were logic zeros. Examples of such side channel attacks are timing attacks, power analysis and cache-line attacks. In these attacks, monitoring of timing, power consumption and/or cache access associated with the cryptosystem can provide a source of information that can be exploited to break the cryptosystem (i.e., learn operations and/or keys of the cryptographic algorithm in order to illicitly obtain plaintext protected by encryption and/or impersonate a source using a digital signature).

SUMMARY

Illustrative embodiments of the invention provide blinding functions for use with elliptic curve cryptographic (ECC) algorithms in order to prevent, or at least limit, side channel attacks.

For example, a method comprises the following steps. A blinding function is generated. The blinding function is applied to a random value to generate a blinded random value. The blinded random value is utilized for one or more scalar multiplications in an elliptic curve cryptographic operation.

In another embodiment, an article of manufacture is provided which comprises a processor-readable storage medium having encoded therein executable code of one or more software programs. The one or more software programs when executed by at least one processing device implement steps of the above-described method.

In a further embodiment, an apparatus comprises a memory and a processor operatively coupled to the memory and configured to perform steps of the above-described method.

These and other features and advantages of the present invention will become more readily apparent from the accompanying drawings and the following detailed description.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the phrases "computer network" and "computer network environment" as used herein are intended to be broadly construed, so as to encompass, for example, any system comprising multiple networked processing devices. While illustrative embodiments of the invention will be described herein in the context of an elliptic curve cryptography (ECC) digital signature application, it is to be appreciated that embodiments are applicable to other ECC applications such as, for example, ECC Diffie Hellman key agreement, as well as cryptographic applications that are similar to ECC applications and that would benefit from the use of a blinding function as provided herein.

Blinding is a defense against side channel attacks. In general, blinding modifies a given value, with what is known as a blinding value. This modified value is then used in the cryptographic algorithm. The result of the operation is then modified, using an unblinding value, to obtain the result that would have been calculated if the blinding value had not been applied. Each time the given value is used a different blinding value is used. In this way, any side channel type measurements cannot be related back to the original given value. While some form of blinding has been proposed for use with the Rivest, Shamir and Adelman (RSA) algorithm, it would be desirable to have effective blinding functions for ECC algorithms. Illustrative embodiments of the invention advantageously provide blinding functions for use with ECC algorithms in order to prevent, or at least limit, side channel attacks.

Figure 1:
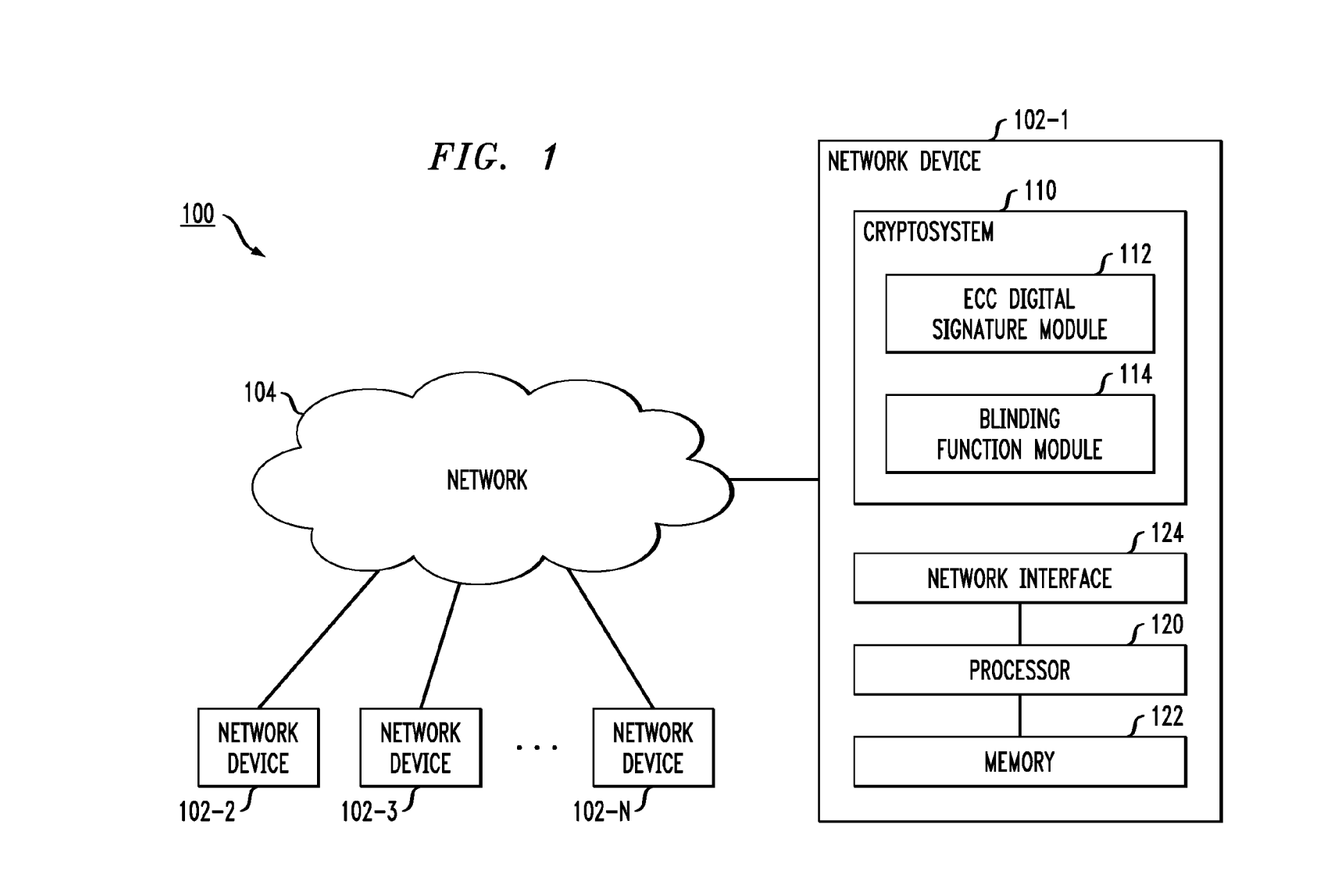
FIG. 1 shows a computer network environment configured to perform elliptic curve cryptography operations with a blinding function in an illustrative embodiment of the invention.

FIG. 1 shows a computer network environment 100 configured in accordance with an illustrative embodiment of the invention. The computer network environment 100 comprises a plurality of network devices 102-1, 102-2, 102-3, . . . , 102-N. The network devices are coupled to a network 104. The network devices 102-1, 102-2, 102-3, . . . , 102-N may comprise, for example, client devices, web servers, network appliances or other types of devices, in any combination. Such devices are examples of what are more generally referred to herein as "processing devices."

It is assumed that the network devices 102-1, 102-2, 102-3, . . . , 102-N comprise respective computers associated with a particular activity or enterprise that requires cryptographic operations to be employed during communications (e.g., data or message exchange) between the network devices and/or devices outside the network. Numerous operating scenarios involving a wide variety of different types and arrangements of processing devices and networks are possible, as will be appreciated by those skilled in the art.

The network 104 is assumed to comprise a global computer network such as the Internet, although other types of networks can be part of the computer network environment 100, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising network devices configured to communicate using the Internet Protocol (IP) or other related communication protocols.

As shown, network device 102-1 is configured with a cryptosystem 110. It is to be understood that the term "cryptosystem" generally refers to a system (e.g., configured as software, hardware, or combinations thereof) that performs one or more cryptographic operations. Here, the cryptosystem 110 comprises an ECC digital signature module 112 and a blinding function module 114. The blinding function module 114 is configured to perform blinding for ECC digital signature operations performed by the ECC digital signature module 112 in order to prevent, or at least diminish, side channel attacks on the cryptosystem 110. Illustrative methodologies for performing these blinding functions will be described below in the context of FIGS. 2A, 2B, 3A and 3B. It is to be appreciated that this particular arrangement of modules is presented by way of example only, and alternative arrangements can be used in other embodiments. For example, the functionality associated with the modules 112 and 114 in other embodiments can be combined into a single module, or separated across a larger number of modules.

Network device 102-1 in the FIG. 1 embodiment is assumed to be implemented using at least one processing device. Each such processing device generally comprises at least one processor and an associated memory, and implements one or more functional modules for controlling certain features of the cryptosystem 110. More particularly, network device 102-1 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the invention. A given such article of manufacture comprises, for example, a storage device such as a storage disk, a storage array or an integrated circuit containing memory. The term "article of manufacture" as used herein should be understood to exclude transitory, propagating signals.

The network interface 124 allows the network device 102-1 to communicate over the network 104 with one or more of network devices 102-2, 102-3, . . . , 102-N, or other devices (not expressly shown), and illustratively comprises one or more conventional transceivers.

In one or more illustrative embodiments, at least portions of the cryptosystem 110, such as portions of one or more of ECC digital signature module 112 and blinding function module 114, may be implemented at least in part in the form of software that is stored in memory 122 and executed by processor 120.

It is to be understood that the particular set of elements for performing blinding functions for the ECC digital signature operations in network device 102-1 of computer network environment 100 is presented by way of illustrative example only, and in other embodiments additional or alternative elements may be used. Thus, another embodiment may include additional or alternative systems, devices and other network entities, as well as different arrangements of modules and other components. Furthermore, it is to be understood that one or more of network devices 102-2, 102-3, . . . , 102-N may be configured with the same or similar arrangement illustratively shown and described above for network device 102-1.

Before describing the blinding functions according to illustrative embodiments, a brief overview of an ECC digital signature algorithm (DSA) will follow. Further details of the ECC DSA (ECDSA) can be found in the Digital Signature Standard (DSS) issued by the National Institute of Standards and Technology (NIST) and identified as Federal Information Processing Standards Publication 186-4, July 2013, the disclosure of which is incorporated by reference in its entirety herein. It is understood, however, that ECC applications other than DSA can apply and thus benefit from the blinding functionalities described herein.

As is known, in an ECC DSA algorithm, one network device is the authenticator (originator) and the other network device is the verifier (recipient). The authenticator has a key pair including a private key and public key. The private key is used by the authenticator to sign a message, and the verifier uses the originator's public key to verify the authenticity of the signature (and thus the authenticity of the originator since it is presumed that only the originator would have access to its own private key). Also, if the message is modified before reaching the recipient, the signature verification fails because the original signature is not valid for the modified message.

In general, the key pair includes a private key integer d which is randomly selected and a public key curve point Q which is generated by scalar multiplying the private key integer d by a base point P selected from the elliptic curve being used for the DSA operation. The message m (to be communicated) is hashed to a bit string of length no more than the bit length of q (where q is the multiplicative order of the base point P), which is then transformed to an integer e. A cryptographically secure random integer k is selected such that $1 \leq k \leq q-1$, and the curve point $(x1, y1)=k \cdot P$ is computed via scalar multiplication. A value r is computed as $r=x1 \mod q$ (where mod is modulo operator). A value s is then calculated as $s=k^{-1} (e+dr) \mod q$. The signature sent to the verifier is the pair (r, s). The verifier then performs the ECDSA signature verification algorithm given (r, s), Q (the authenticator's public key component), P and other agreed upon domain parameters. Note that r and s need to be nonzero values, and k must not be revealed and must be a per-message secret, i.e., it must not be used for more than one message. However, as mentioned above, scalar multiplication computations used in such a DSA process are susceptible to side channel attacks based on measuring of timing, power consumption and/or cache access during the computation.

As such, embodiments of the invention advantageously provide techniques for preventing, or at least limiting, such side channel attacks by applying a blinding function to the scalar multiplication computations.

In general, an illustrative procedure for generating and using such a blinding function according to embodiments of the invention is as follows. A random scalar blinding value, for example, in the range 2 to curve order-2, is generated. The blinding value is scalar multiplied by the base point to create a blinding point and then, from the blinding point, create an unblinding point. By way of example only, these steps can be performed in the blinding function module 114 shown in FIG. 1. Then, for each scalar multiplication operation to protect: a. add the blinding value to the scalar value intended to be protected; b. scalar multiply with result of previous step; c. add the unblinding point to the result of the previous step; d. double the blinding value; and e. double the unblinding point. These steps can be performed by the ECC module 112 in conjunction with the blinding function module 114. Several embodiments of this illustrative procedure will now be described in detail.

Figure 2A:
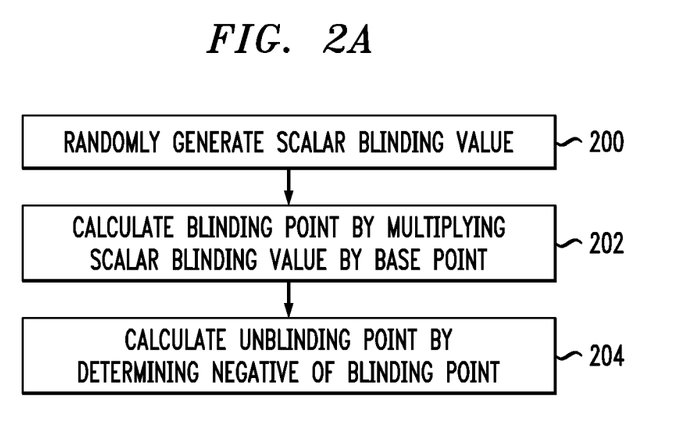
FIGS. 2A and 2B show an elliptic curve cryptography methodology with a blinding function in an illustrative embodiment of the invention.

In one illustrative embodiment, as illustrated in FIG. 2A, the following blinding parameters are generated. It is to be understood that the methodology of FIG. 2A is performed before any ECC digital signature operations are performed.

In step 200, a scalar blinding value $b_1$ is randomly generated in the range 2 to q−2, i.e., $2 \geq b_1 \geq q-2$.

Then, in step 202, a blinding point $B_1$ is calculated as $b_1$ scalar multiplied by the base point P.

In step 204, an unblinding point $U_1$ is calculated by finding the negative of blinding point $B_1$. This step is computationally trivial. That is, $U_1 = -(b_1 \cdot P)$.

As mentioned above, when performing a signature operation, a random value, k, is generated and scalar multiplied by the base point P. If this value is revealed and the public signature and public key is known, then the private key can be calculated.

Figure 2B:
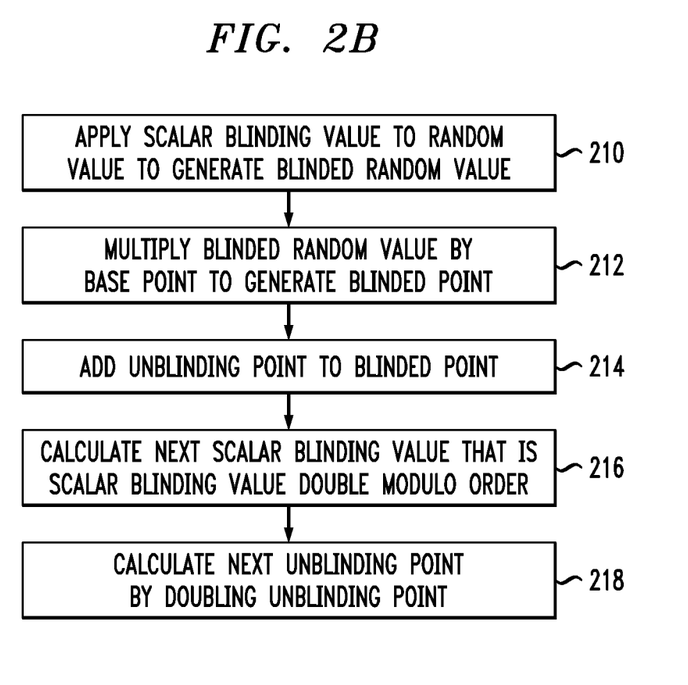

To blind the scalar multiplication, the methodology in FIG. 2B is performed.

In step 210, the scalar blinding value $b_1$ is applied to the random value to generate a blinded random value. More particularly, random value k has the blinding value $b_1$ added to it modulo the order, i.e.:

$$k_b = k + b_1 \bmod q$$

where $k_b$ is the blinded random value.

Then, in step 212, the blinded random value $k_b$ is scalar multiplied by the base point P:

$$K_b = k_b \cdot P$$

where $K_b$ is the resulting blinded point.

In step 214, the resulting point $K_b$ has the unblinding point $U_1$ (calculated in step 204) added to it:

$$K = K_b + U_1$$

In step 216, a next scalar blinding value $b_1'$ is calculated as the scalar blinding value $b_1$ double modulo the order:

$$b_1' = b_1 \cdot 2 \bmod q$$

In step 218, a next blinding point $U_1'$ is calculated as double the unblinding point:

$$U_1' = 2 \cdot U_1$$

It is to be understood that the "next" scalar blinding value and "next" blinding point (respectively calculated in steps 216 and 218) are used in a subsequent scalar multiplication operation. This is to ensure that, in this embodiment, different blinding parameters are used in each scalar multiplication operation.

The blinding value and optionally the unblinding point can be modified at any time between scalar multiplications. These blinding parameters can be recalculated at regular intervals. If the unblinding point is not supplied in advance, then it is calculated in real-time.

Accordingly, the required K (k·P) used in the signature operations described above is calculated as:

$$U_1 = -(b_1 \cdot P) \text{ and}$$

$$K = K_b + U_1 \text{ therefore,}$$

$$K = k_b \cdot P + -(b_1 \cdot P) \text{ therefore,}$$

$$K = (k+b_1) \cdot P + -(b_1 \cdot P) \text{ therefore,}$$

$$K = (k+b_1-b_1) \cdot P, \text{ therefore,}$$

$$K = k \cdot P$$

While the initial scalar multiplication operation to obtain the blinding point $B_1$ is relatively expensive, the operations performed for each scalar multiplication are not.

Recall that the blinding value in the embodiment of FIGS. 2A and 2B is double modulo the order. The order is related to the field value. With prime curves, the field value is a prime. For efficiency reasons the prime, p, is chosen to be $2^x - m$ where x is twice the security strength (i.e., x=256) and m is a small number say less than 1000, or $2^x \pm 2^a - 1$, or $2^x \pm 2^a \pm 2^b \pm 2^c - 1$. The order, q, for prime curves is between the p+1+2 times the square root of p and p+1−2 times the square root of p: $(p+1+2\sqrt{p}) \geq q \geq (p+1-2\sqrt{p})$. This means that many bits at the top of the order will be logic one. When performing modulo operations with such an order, it is realized here that the blinding value will only 'randomly' change in a few bits at the bottom. Repeated operations with the same secret value and blinding value changing in this way could leak information in a side channel attack.

Figure 3A:
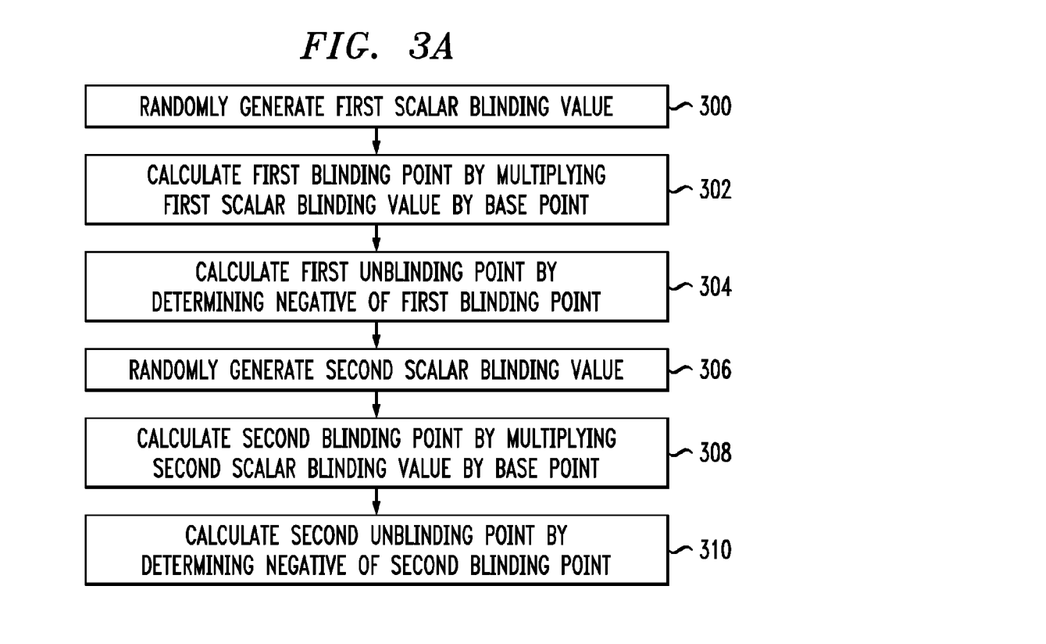
FIGS. 3A and 3B show an elliptic curve cryptography methodology with a blinding function in another illustrative embodiment of the invention.
Figure 3B:
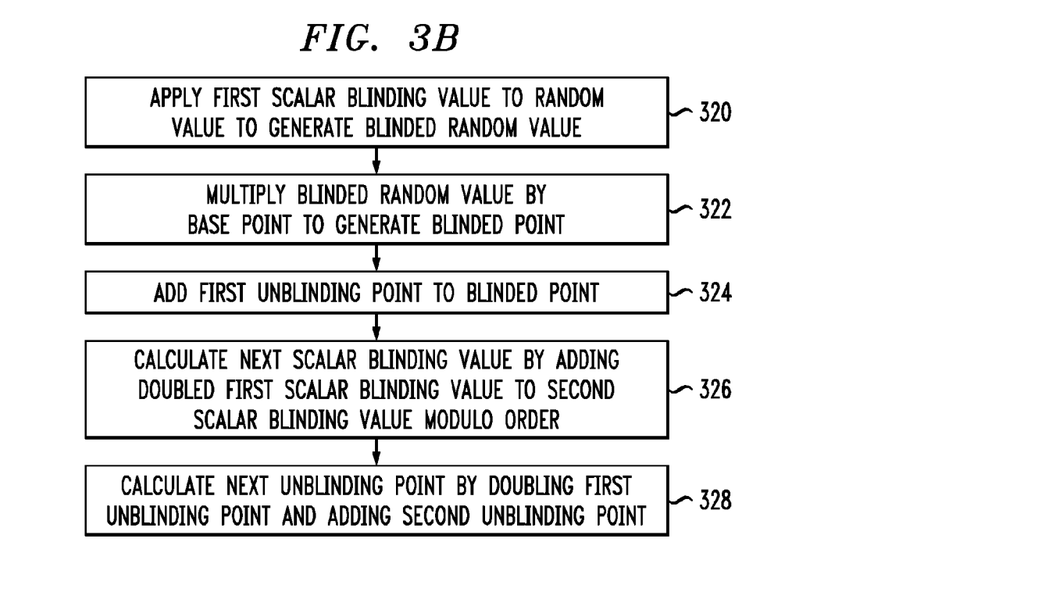

Accordingly, in another illustrative embodiment, to ensure that the blinding value used changes unpredictably, a second blinding value is used as illustrated in FIGS. 3A and 3B.

As shown in FIG. 3A, the following blinding parameters are generated. It is to be understood that the methodology of FIG. 3A is performed before any ECC digital signature operations are performed.

In step 300, a first scalar blinding value $b_1$ is randomly generated in the range 2 to q−2, i.e., $2 \geq b_1 \geq q-2$.

Then, in step 302, a first blinding point $B_1$ is calculated as $b_1$ scalar multiplied by the base point P.

In step 304, a first unblinding point $U_1$ is calculated by finding the negative of the first blinding point $B_1$. This step is computationally trivial. That is, $U_1 = -(b_1 \cdot P)$.

In step 306, a second scalar blinding value $b_2$ is randomly generated in the range 2 to q−2, i.e., $2 \geq b_1 \geq q-2$.

Then, in step 308, a second blinding point $B_2$ is calculated as $b_2$ scalar multiplied by the base point P.

In step 310, a second unblinding point $U_2$ is calculated by finding the negative of the second blinding point $B_2$. This step is computationally trivial, i.e., $U_2 = -(b_2 \cdot P)$.

Again, as mentioned above, when performing a signature operation, a random value, k, is generated and scalar multiplied by the base point P. If this value is revealed and the public signature and public key is known, then the private key can be calculated.

To blind the scalar multiplication, the methodology in FIG. 3B is performed.

In step 320, the scalar blinding value $b_1$ is applied to the random value to generate a blinded random value. More particularly, random value k has the blinding value $b_1$ added to it modulo the order, i.e.:

$$k_b = k + b_1 \bmod q$$

where $k_b$ is the blinded random value.

Then, in step 322, the blinded random value $k_b$ is scalar multiplied by the base point P:

$$K_b = k_b \cdot P$$

where $K_b$ is the resulting blinded point.

In step 324, the resulting point $K_b$ has the first unblinding point $U_1$ (calculated in step 204) added to it:

$$K = K_b + U_1$$

In step 326, a next scalar blinding value $b_1'$ is calculated as the first scalar blinding value $b_1$ doubled and added to the second scalar blinding value and then modulo the order:

$$b_1' = (b_1 \cdot 2 + b_2) \bmod q$$

In step 328, a next blinding point $U_1'$ is calculated as double the first unblinding point added to the second unblinding point:

$$U_1' = 2 \cdot U_1 + U_2$$

It is to be understood that the "next" scalar blinding value and "next" blinding point (respectively calculated in steps 326 and 328) are used in a subsequent scalar multiplication operation. This is to ensure that, in this embodiment, different blinding parameters are used in each scalar multiplication operation.

Again, the blinding value and optionally the unblinding point can be modified at any time between scalar multiplications. These blinding parameters can be recalculated at regular intervals. If the unblinding point is not supplied in advance, then it is calculated in real-time.

Accordingly, the required K (k·P) used in the signature operations described above is calculated as:

$$U_1 = -(b_1 \cdot P) \text{ and}$$

$$K = K_b + U_1 \text{ therefore,}$$

$$K = k_b \cdot P + -(b_1 \cdot P) \text{ therefore,}$$

$$K = (k + b_1) \cdot P + -(b_1 \cdot P) \text{ therefore,}$$

$$K = (k + b_1 - b_1) \cdot P, \text{ therefore,}$$

$$K = k \cdot P$$

While the initial scalar multiplication operation to obtain unblinding point $U_1$ is expensive, the operations performed for each scalar multiplication are not.

Furthermore, it is to be appreciated that the unblinding point $U_1$, described herein, can be calculated either by calculating $(q-b_1) \cdot P$ or $-(b_1 \cdot P)$. That is, the cryptosystem can either subtract the blinding value from the order and multiply by the point or multiply $b_1$ by the point and calculate the negative. Either way, calculating $U_1$ from $b_1$ is computationally expensive as a scalar multiplication is required.

Figure 4:
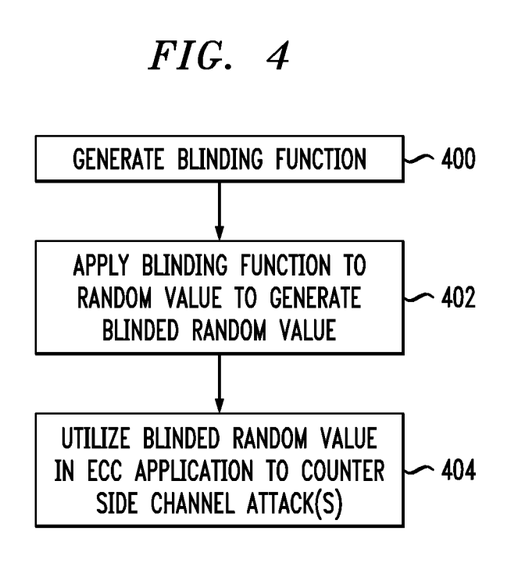
FIG. 4 shows an elliptic curve cryptography application with a blinding function in an illustrative embodiment of the invention.

FIG. 4 shows an ECC methodology using a blinding function in accordance with an illustrative embodiment. As shown, a blinding function is generated in step 400. The blinding function can comprise the blinding value(s), blinding point(s), and unblinding point(s) (i.e., blinding parameters associated with the blinding function) calculated in the embodiment of FIGS. 2A and 2B, the embodiment of FIGS. 3A and 3B, or variations thereof.

In step 402, the blinding function is applied to a random value to generate a blinded random value. Again, by way of example, this random value to which the blinding function is applied may be the random value used in the scalar multiplication operations associated with an ECC application such as ECDSA or ECDH. In step 404, the blinded random value is utilized in the ECC application to counter side channel attacks, as illustratively described in detail herein.

Accordingly, as explained herein, ECC algorithms perform calculations on private values such as a private key or a nonce. Side channel attacks on the ECDSA signature scheme can reveal the private key by observing the central processing unit (CPU) during the signing operation. The implementation of the scalar multiplication operation has data dependent branches that can be detected by flush-reload attacks on Intel x86-32 bit and 64-bit CPUs. Embodiments of the invention provide a blinding value that can be applied to the scalar before multiplication and use the corresponding unblinding point to mitigate these types of side channel attacks. The private value used in the scalar multiplication is effectively randomized so that observing the CPU during the scalar multiplication operation reveals nothing about the private value.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. A method, comprising;
   generating, at a first network device comprising a processor operatively coupled to memory, a blinding function;
   applying, at the first network device, the blinding function to a random value to generate a blinded random value; and
   utilizing, at the first network device, the blinded random value for one or more scalar multiplications in an elliptic curve cryptographic operation to limit a side channel attack on cryptographic operations employed during communications between the first network device and a second network device over at least one network;
   wherein the first network device sends one or more messages to the second network device as part of said communications;
   wherein the step of generating the blinding function comprises:
      randomly generating a scalar blinding value;
      calculating a blinding point by multiplying the scalar blinding value by a base point from an elliptic curve selected for the elliptic curve cryptographic operation; and calculating an unblinding point based on the blinding point; and wherein the step of applying the blinding function comprises adding the random value to the scalar blinding function modulo the multiplicative order of the base point to generate the blinded random value.

2. The method of claim 1, wherein the step of utilizing the blinded random value further comprises multiplying the blinded random value by the base point to generate a blinded point.

3. The method of claim 2, wherein the step of utilizing the blinded random value further comprises adding the unblinding point to the blinded point.

4. The method of claim 3, wherein the step of utilizing the blinded random value further comprises calculating a next scalar blinding value as the scalar blinding value double modulo the multiplicative order.

5. The method of claim 4, wherein the step of utilizing the blinded random value further comprises calculating a next unblinding point by doubling the unblinding point.

6. The method of claim 1, wherein randomly generating the scalar blinding value further comprises randomly generating a first scalar blinding value and a second scalar blinding value.

7. The method of claim 6, wherein calculating the blinding point further comprises:
calculating a first blinding point by multiplying the first scalar blinding value by the base point; and
calculating a second blinding point by multiplying the second scalar blinding value by the base point.

8. The method of claim 7, wherein calculating the unblinding point further comprises:
calculating a first unblinding point based on the first blinding point; and
calculating a second unblinding point based on the second blinding point.

9. The method of claim 8, wherein the step of applying the blinding function further comprises adding the random value to the first scalar blinding value modulo the multiplicative order of the base point to generate the blinded random value.

10. The method of claim 9, wherein the step of utilizing the blinded random value further comprises multiplying the blinded random value by the base point to generate a blinded point.

11. The method of claim 10, wherein the step of utilizing the blinded random value further comprises adding the first unblinding point to the blinded point.

12. The method of claim 11, wherein the step of utilizing the blinded random value further comprises calculating a next scalar blinding value by adding double the first scalar blinding value to the second scalar blinding value modulo the multiplicative order.

13. The method of claim 12, wherein the step of utilizing the blinded random value further comprises calculating a next unblinding point by doubling the first unblinding point and adding the second unblinding point.

14. The method of claim 1, wherein the elliptic curve cryptographic operation comprises one of an elliptic curve digital signature operation and an elliptic curve key agreement operation.

15. An article of manufacture comprising a processor-readable storage medium having encoded therein executable code of one or more software programs, wherein the one or more software programs when executed by the one or more processing devices implement the steps of:
generating, at a first network device comprising a processor operatively coupled to memory, a blinding function;
applying, at the first network device, the blinding function to a random value to generate a blinded random value; and
utilizing, at the first network device, the blinded random value for one or more scalar multiplications in an elliptic curve cryptographic operation to limit a side channel attack on cryptographic operations employed during communications between the first network device and a second network device over at least one network;
wherein the first network device sends one or more messages to the second network device as part of said communications;
wherein the step of generating the blinding function comprises:
randomly generating a scalar blinding value;
calculating a blinding point by multiplying the scalar blinding value by a base point from an elliptic curve selected for the elliptic curve cryptographic operation; and
calculating an unblinding point based on the blinding point; and
wherein the step of applying the blinding function comprises adding the random value to the scalar blinding function modulo the multiplicative order of the base point to generate the blinded random value.

16. An apparatus comprising:
a first network device, the first network device comprising a processor operatively coupled to a memory and configured to:
generate a blinding function;
apply the blinding function to a random value to generate a blinded random value; and
utilize the blinded random value for one or more scalar multiplications in an elliptic curve cryptographic operation to limit a side channel attack on cryptographic operations employed during communications between the first network device and a second network device over at least one network;
wherein the first network device sends one or more messages to the second network device as part of said communications;
wherein the processor is configured to generate the blinding function by:
randomly generating a scalar blinding value;
calculating a blinding point by multiplying the scalar blinding value by a base point from an elliptic curve selected for the elliptic curve cryptographic operation; and
calculating an unblinding point based on the blinding point; and
wherein the processor is configured to apply the blinding function by adding the random value to the scalar blinding function modulo the multiplicative order of the base point to generate the blinded random value.

17. The method of claim 1, wherein the first network device comprises an authenticator in an elliptic curve cryptography digital signature algorithm and the second network device comprises a verifier in the elliptic curve cryptography digital signature algorithm.

18. The method of claim 1, wherein the first network device and the second network device comprise respective parties in an elliptic curve cryptography Diffie Hellman key agreement.

19. The method of claim 1, wherein the one or more scalar multiplications are performed using a private value, and wherein the private value is substantially randomized such that observing the one or more processing devices performing the elliptic curve cryptographic operations does not reveal information about the private value.

20. The method of claim 1, wherein implementation of the one or more scalar multiplications in the elliptic curve cryptographic operation has one or more data dependent branches that can be detected by flush-reload attacks, and wherein utilizing the blinded random value for the one or more scalar multiplications in the elliptic curve cryptographic operation mitigates the flush-reload attacks by randomizing a private value used in the one or more scalar multiplications.

* * * * *